US 9,111,203 B2

United States Patent
Iwata et al.

(10) Patent No.: US 9,111,203 B2
(45) Date of Patent: Aug. 18, 2015

(54) IMAGE FORMING APPARATUS

(71) Applicants: Muneaki Iwata, Kanagawa (JP);
Masaaki Ishida, Kanagawa (JP);
Atsufumi Omori, Kanagawa (JP);
Hayato Fujita, Kanagawa (JP)

(72) Inventors: Muneaki Iwata, Kanagawa (JP);
Masaaki Ishida, Kanagawa (JP);
Atsufumi Omori, Kanagawa (JP);
Hayato Fujita, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/193,271

(22) Filed: Feb. 28, 2014

(65) Prior Publication Data
US 2014/0268186 A1 Sep. 18, 2014

(30) Foreign Application Priority Data
Mar. 15, 2013 (JP) .................. 2013-054368

(51) Int. Cl.
G06K 15/02 (2006.01)
H04N 1/40 (2006.01)
H04N 1/60 (2006.01)
G06K 15/14 (2006.01)
H04N 1/113 (2006.01)
H04N 1/409 (2006.01)

(52) U.S. Cl.
CPC ............ *G06K 15/1873* (2013.01); *G06K 15/14* (2013.01); *H04N 1/113* (2013.01); *H04N 1/409* (2013.01)

(58) Field of Classification Search
None
See application file for complete search history.

(56) References Cited

U.S. PATENT DOCUMENTS

| 4,905,022 | A  | * | 2/1990 | Nagasawa ............... 347/247 |
| 7,327,495 | B2 | * | 2/2008 | Kawamoto et al. ......... 358/3.07 |
| 2002/0080377 | A1 | * | 6/2002 | Tonami et al. .............. 358/1.9 |
| 2002/0126315 | A1 | * | 9/2002 | Nabeshima ................ 358/3.03 |
| 2003/0156184 | A1 | * | 8/2003 | Suzuki et al. .............. 347/249 |
| 2003/0194145 | A1 | * | 10/2003 | Chiba et al. ................ 382/243 |
| 2004/0061883 | A1 | * | 4/2004 | Kanatsu .................... 358/1.9 |
| 2004/0100548 | A1 | * | 5/2004 | Seki ......................... 347/119 |
| 2005/0030482 | A1 | * | 2/2005 | Childers et al. ............. 353/31 |
| 2006/0209317 | A1 | * | 9/2006 | Shoda et al. ............... 358/1.2 |
| 2006/0285186 | A1 |   | 12/2006 | Ishida et al. |
| 2007/0030548 | A1 |   | 2/2007 | Nihei et al. |

(Continued)

FOREIGN PATENT DOCUMENTS

JP 2007-125826 5/2007
JP 2008-040088 2/2008

(Continued)

*Primary Examiner* — Marivelisse Santiago Cordero
*Assistant Examiner* — Moustapha Diaby
(74) *Attorney, Agent, or Firm* — Oblon, McClelland, Maier & Neustadt, L.L.P.

(57) ABSTRACT

An image forming apparatus that forms an image according to light emitted from a light source is provided. The image forming apparatus includes: a first image processor that performs image processing on image data having a first resolution and outputs the resulting image data; a resolution converter that acquires the image data having the first resolution output from the first image processor and converts the image data to image data having a second resolution that is higher than the first resolution; a modulation signal generator that modulates the image data having the second resolution according to a clock signal to thereby generate a modulation signal; a light source driver that drives the light source according to the modulation signal; and a second image processor that performs image processing on the image data having the second resolution to be modulated to the modulation signal.

10 Claims, 14 Drawing Sheets

(56) References Cited

U.S. PATENT DOCUMENTS

| | | |
|---|---|---|
| 2007/0091163 A1* | 4/2007 | Omori et al. ............... 347/234 |
| 2007/0132828 A1 | 6/2007 | Ishida et al. |
| 2008/0088893 A1 | 4/2008 | Ishida et al. |
| 2008/0123160 A1 | 5/2008 | Omori et al. |
| 2008/0204769 A1* | 8/2008 | Hoshino ..................... 358/1.2 |
| 2008/0218813 A1 | 9/2008 | Tanabe et al. |
| 2008/0225106 A1 | 9/2008 | Omori et al. |
| 2008/0239336 A1 | 10/2008 | Tanabe et al. |
| 2008/0267532 A1* | 10/2008 | Matsumoto et al. ........ 382/298 |
| 2008/0267663 A1 | 10/2008 | Ichii et al. |
| 2008/0291259 A1 | 11/2008 | Nihei et al. |
| 2008/0298842 A1 | 12/2008 | Ishida et al. |
| 2009/0091805 A1 | 4/2009 | Tanabe et al. |
| 2009/0167837 A1 | 7/2009 | Ishida et al. |
| 2009/0174915 A1 | 7/2009 | Nihei et al. |
| 2009/0175543 A1* | 7/2009 | Nielsen ..................... 382/204 |
| 2009/0195635 A1 | 8/2009 | Ishida et al. |
| 2009/0231656 A1 | 9/2009 | Suzuki et al. |
| 2009/0303451 A1 | 12/2009 | Miyake et al. |
| 2010/0045767 A1 | 2/2010 | Nihei et al. |
| 2010/0060918 A1* | 3/2010 | Yamaguchi ................. 358/1.9 |
| 2010/0119262 A1 | 5/2010 | Omori et al. |
| 2010/0208277 A1* | 8/2010 | Murakami et al. .......... 358/1.2 |
| 2010/0214637 A1 | 8/2010 | Nihei et al. |
| 2011/0199657 A1 | 8/2011 | Ishida et al. |
| 2011/0228037 A1 | 9/2011 | Omori et al. |
| 2011/0304683 A1 | 12/2011 | Ishida et al. |
| 2012/0099165 A1 | 4/2012 | Omori et al. |
| 2012/0189328 A1* | 7/2012 | Suzuki et al. ................. 399/32 |
| 2012/0274950 A1* | 11/2012 | Shoji ........................... 358/1.2 |
| 2012/0293783 A1 | 11/2012 | Ishida et al. |
| 2013/0033558 A1 | 2/2013 | Akatsu et al. |
| 2013/0302052 A1 | 11/2013 | Iwata et al. |

FOREIGN PATENT DOCUMENTS

| | | |
|---|---|---|
| JP | 4640257 | 12/2010 |
| JP | 4968902 | 4/2012 |

* cited by examiner

FIG.12A
5-POINT MINCHO TYPEFACE
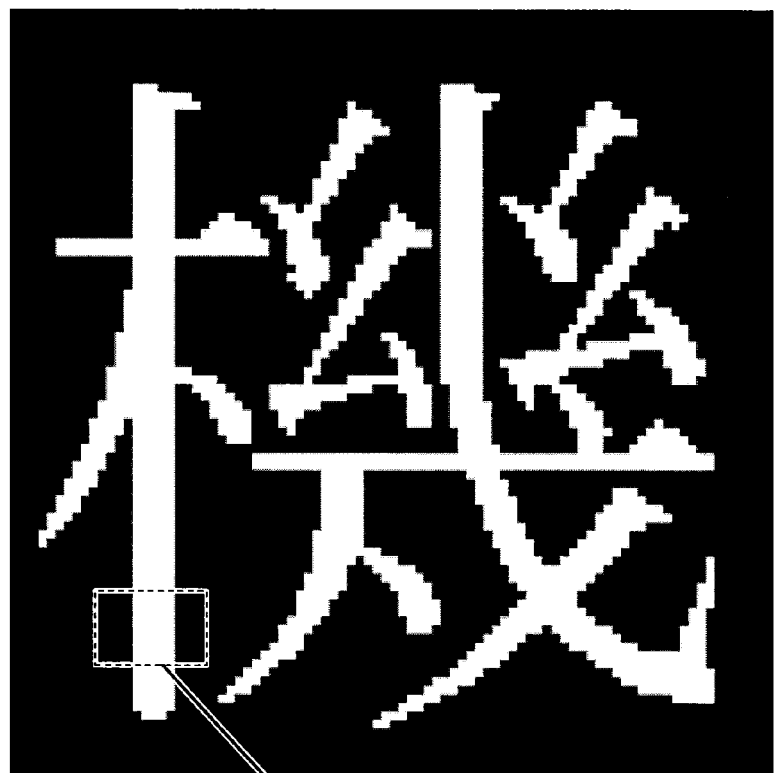
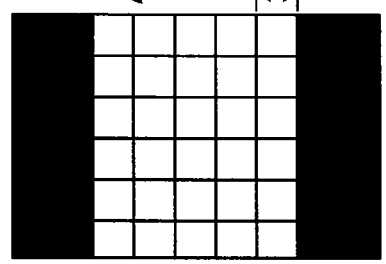
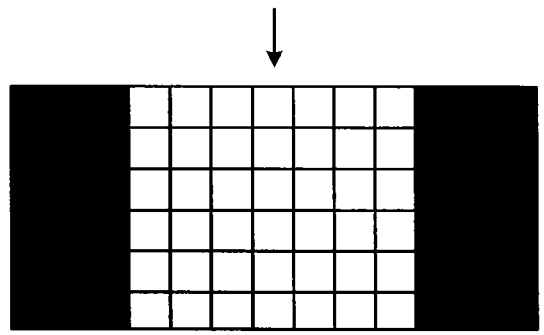
ENLARGING STEPS IN UNITS OF
1200 dpi

FIG.12B
3-POINT MINCHO TYPEFACE
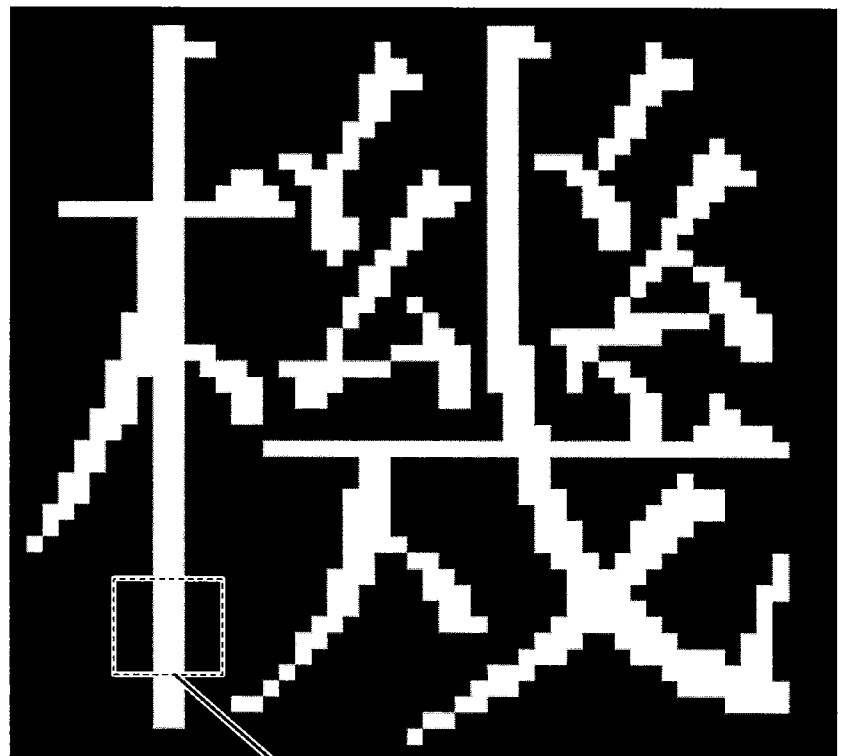
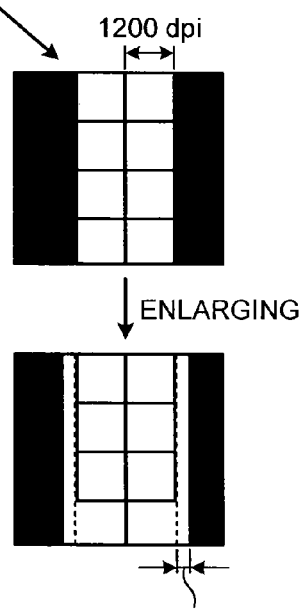
ENLARGING STEPS IN UNITS
4800 dpi BY LIGHT SOURCE MODULATION

FIG.13A
5-POINT MINCHO TYPEFACE
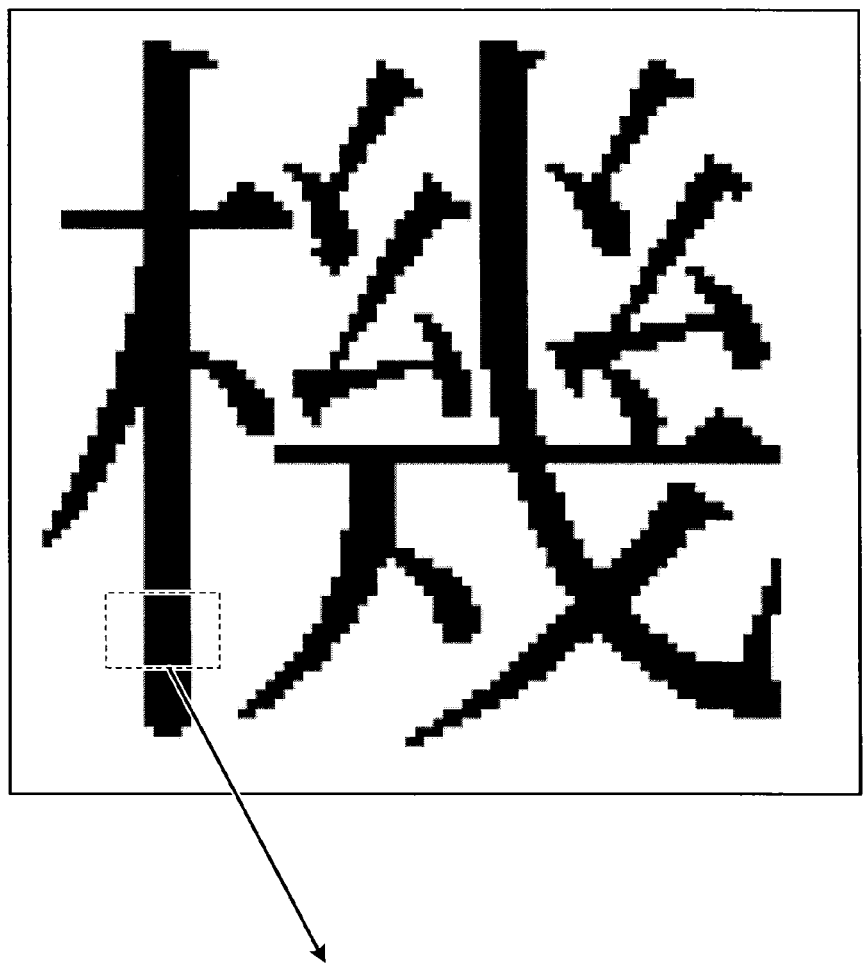
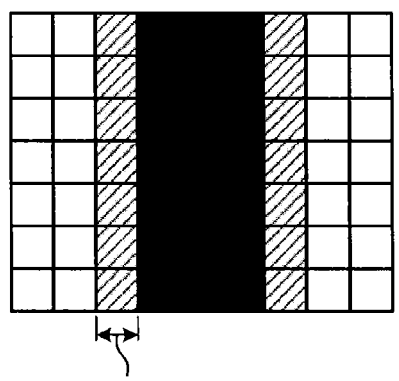
IMAGE PROCESSING IN
UNITS OF 1200 dpi

FIG.13B
3-POINT MINCHO TYPEFACE
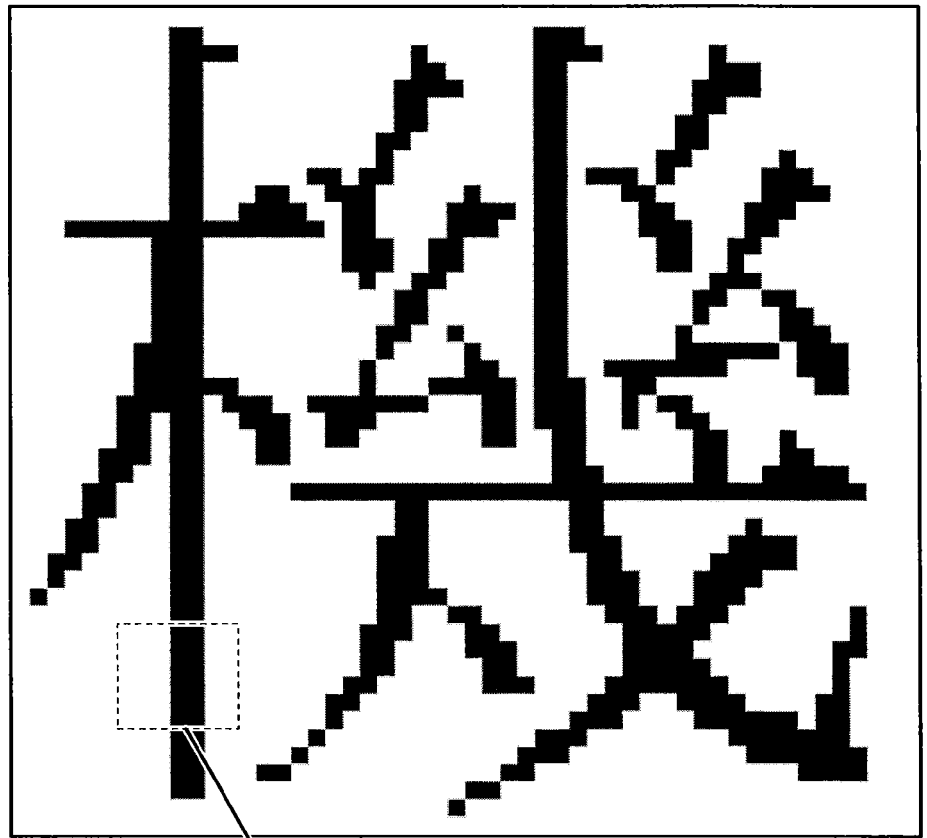
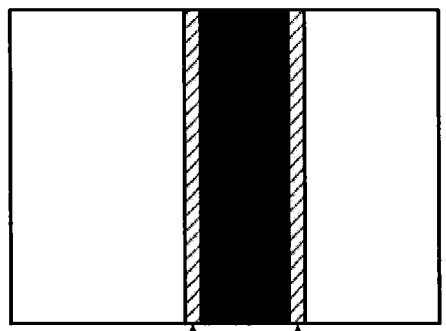
IMAGE PROCESSING IN UNITS OF 4800 dpi
(LUMINANCE VALUE ADJUSTMENT,
LIGHT INTENSITY ADJUSTMENT)

(A) SMOOTHING AT 1200 dpi (B) THICKENING (C) SMOOTHING AT 4800 dpi

IMAGE FORMING APPARATUS

CROSS-REFERENCE TO RELATED APPLICATIONS

The present application claims priority to and incorporates by reference the entire contents of Japanese Patent Application No. 2013-054368 filed in Japan on Mar. 15, 2013.

BACKGROUND OF THE INVENTION

1. Field of the Invention

The present invention relates to an image forming apparatus.

2. Description of the Related Art

Digital printers employing an electrophotographic process have lately become widely used in the production printing field. The digital printers employing the electrophotographic process are thus required to offer higher image quality and greater reliability. The digital printers employing the electrophotographic process are particularly required to offer, for example, improved fine line reproducibility, improved character reproducibility (e.g., improved reproducibility of characters of minute sizes corresponding to 2 to 3 points), inhibition of characters from becoming broader due to the electrophotographic process, and improved color shift correction accuracy.

In order to achieve the higher image quality, the digital printer employing the electrophotographic process includes an image processor that corrects image data through image processing. The image processor performs image processing for, for example, multi-bit data having a high resolution of 1200 dots per inch (dpi) or 2400 dpi.

The digital printer employing the electrophotographic process further includes, for example, a photosensitive drum, a light source, a polygon mirror, and a scanning optical system. Specifically, the photosensitive drum has a surface that functions as a scanned surface having photosensitivity. The light source emits a laser beam. The polygon mirror deflects the laser beam from the light source. The scanning optical system guides the laser beam deflected by the polygon mirror onto the surface (scanned surface) of the photosensitive drum. The digital printer employing the electrophotographic process modulates the light beam emitted from the light source according to the image data to thereby irradiate the scanned surface with the light beam from the light source. And by scanning the scanned surface with the light beam, the digital printer employing the electrophotographic process forms an electrostatic latent image on the photosensitive drum according to the image data.

The digital printer employing the electrophotographic process having the configuration as described above includes as the light source a laser diode array (LDA), a vertical-cavity surface-emitting laser (VCSEL), or other element having a plurality of light emitting points. This enables the digital printer employing the electrophotographic process to form an electrostatic latent image having a resolution higher than image data of 1200 dpi, specifically, a 2400-dpi or 4800-dpi electrostatic latent image.

Japanese Patent Nos. 4968902 and 4640257 each disclose a technique in which, through processing performed by an image processor, outlined portions in the image are detected and outlines are extended or pixels around white-on-black inverted characters are corrected. Thereby, inverted characters are prevented from being collapsed and improved character reproducibility is achieved. Japanese Patent No. 4912071 discloses an arrangement in which a light source drive circuit includes a light source modulation signal generating circuit that corrects bend and skew in a scanning line (a locus of a light beam deflected by a polygon mirror).

Processing of a high-density image involves a problem in data transfer from the image processor to the light source drive circuit downstream thereof. If the image processor processes multi-bit data images with a resolution, for example, of 2400 dpi or 4800 dpi, the degree of freedom in image processing is enhanced and reproducibility of 1200-dpi characters and lines of minute sizes can be improved. In high-density image processing, however, an enormous amount of data needs to be transferred from the image processor to the downstream light source drive circuit, which is a bottleneck in productivity.

If the correction is made with the light source modulation signal generating circuit of the downstream light source drive circuit as in Japanese Patent No. 4912071, the amount of data transferred from the image processor to the light source drive circuit does not increase. The data transferred to the light source drive circuit is, however, converted to light source ON/OFF information, which makes it difficult to perform complicated corrections.

In view of the foregoing situation, there is a need to provide an image forming apparatus capable of performing image processing at high resolutions without increasing an image data transfer amount.

SUMMARY OF THE INVENTION

It is an object of the present invention to at least partially solve the problems in the conventional technology.

According to the present invention, there is provided an image forming apparatus that forms an image according to light emitted from a light source, the image forming apparatus comprising: a first image processor that performs image processing on image data having a first resolution and outputs the resulting image data; a resolution converter that acquires the image data having the first resolution output from the first image processor and converts the image data to image data having a second resolution that is higher than the first resolution; a modulation signal generator that modulates the image data having the second resolution according to a clock signal to thereby generate a modulation signal; a light source driver that drives the light source according to the modulation signal; and a second image processor that performs image processing on the image data having the second resolution to be modulated to the modulation signal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12A is a diagram illustrating an exemplary 5-point white-on-black inverted character and exemplary enlarging steps in units of 1200 dpi;

FIG. 12B is a diagram illustrating an exemplary 3-point white-on-black inverted character and exemplary enlarging steps in units of 4800 dpi;

FIG. 13A is a diagram illustrating exemplary thinning steps in units of 1200 dpi;

FIG. 13B is a diagram illustrating exemplary thinning steps in units of 4800 dpi;

DETAILED DESCRIPTION OF THE PREFERRED EMBODIMENTS

Figure 1:
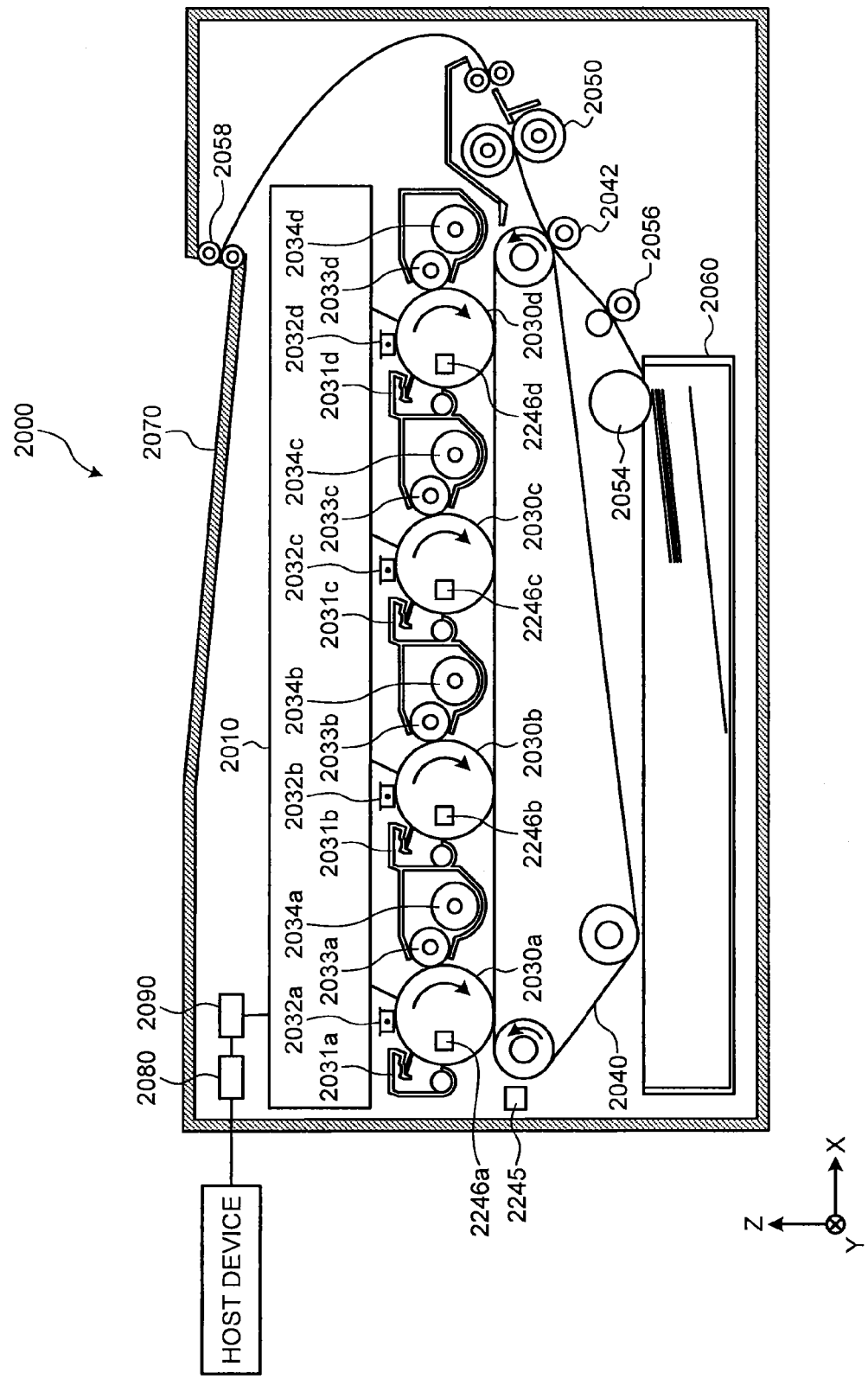
FIG. 1 is a schematic diagram illustrating the configuration of a color printer 2000 according to an embodiment of the present invention.

A color printer 2000 as an exemplary image forming apparatus according to an embodiment of the present invention will be described in detail with reference to the accompanying drawings. FIG. 1 is a schematic diagram illustrating the configuration of the color printer 2000 according to the embodiment.

The color printer 2000 is a tandem type multi-color printer that forms a full-color image by superimposing four colors (black, cyan, magenta, and yellow), one on top of another.

The color printer 2000 includes an optical scanning device 2010, four photosensitive drums 2030a, 2030b, 2030c, 2030d (to be generically referred to as a photosensitive drum 2030), four cleaning units 2031a, 2031b, 2031c, 2031d (to be generically referred to as a cleaning unit 2031), and four charging devices 2032a, 2032b, 2032c, 2032d (to be generically referred to as a charging device 2032). The color printer 2000 further includes four developing rollers 2033a, 2033b, 2033c, 2033d (to be generically referred to as a developing roller 2033) and four toner cartridges 2034a, 2034b, 2034c, 2034d (to be generically referred to as a toner cartridge 2034). The color printer 2000 still further includes a transfer belt 2040, a transfer roller 2042, fixing rollers 2050, a feed roller 2054, a pair of registration rollers 2056, discharging rollers 2058, a paper feed tray 2060, a discharge tray 2070, a communication control device 2080, a density detector 2245, four home position sensors 2246a, 2246b, 2246c, 2246d (to be collectively referred to as a home position sensor 2246), and a printer control device 2090.

The communication control device 2080 controls bi-directional communications with a host device (e.g., a computer) via, for example, a network.

The printer control device 2090 generally controls different elements of the color printer 2000. The printer control device 2090 includes, for example, a central processing unit (CPU), a ROM that stores therein a computer program described in codes to be executed by the CPU and various types of data used for executing the program, a RAM that serves as a working memory, and an AD converter circuit that converts analog data to the corresponding digital data. The printer control device 2090, while controlling each of the different elements according to a request from the host device, transmits image data from the host device to the optical scanning device 2010.

The photosensitive drum 2030a, the charging device 2032a, the developing roller 2033a, the toner cartridge 2034a, and the cleaning unit 2031a are used as one unit. These elements constitute an image forming station to form a black image (may be referred to as a K station).

The photosensitive drum 2030b, the charging device 2032b, the developing roller 2033b, the toner cartridge 2034b, and the cleaning unit 2031b are used as one unit. These elements constitute an image forming station to form a cyan image (may be referred to as a C station).

The photosensitive drum 2030c, the charging device 2032c, the developing roller 2033c, the toner cartridge 2034c, and the cleaning unit 2031c are used as one unit. These elements constitute an image forming station to form a magenta image (may be referred to as an M station).

The photosensitive drum 2030d, the charging device 2032d, the developing roller 2033d, the toner cartridge 2034d, and the cleaning unit 2031d are used as one unit. These elements constitute an image forming station to form a yellow image (may be referred to as a Y station).

The photosensitive drum 2030 has a photosensitive layer formed on its surface. Specifically, the surface of the photosensitive drum 2030 assumes a scanned surface. The photosensitive drums 2030a, 2030b, 2030c, 2030d each have a rotational axis extending in parallel with each other and each rotate, for example, in an identical direction (e.g., in the direction indicated by the arrowed line in plane in FIG. 1).

The following description is based on a viewer's perspective in which, in an XYZ three-dimensional Cartesian coordinate system, a direction extending in parallel with the central axis of the photosensitive drum 2030 is the Y-axis direction and a direction in which the photosensitive drums 2030 are arrayed is the X-axis direction.

The charging device 2032 uniformly charges the surface of the photosensitive drum 2030. The optical scanning device 2010 irradiates the charged surface of the photosensitive drum 2030 with a light beam modulated for each color based on the image data (black image data, cyan image data, magenta image data, yellow image data). As a result, on the surface of the photosensitive drum 2030, an electric charge is erased only on portions irradiated with the light and a latent image corresponding to the image data is formed on the surface of the photosensitive drum 2030. The latent image thus formed moves toward the developing roller 2033 as the photosensitive drum 2030 rotates. The configuration of the optical scanning device 2010 will be described in detail later.

In the photosensitive drum 2030, an area in which image data is written may be called an "effective scanning area", an "image forming area", or an "effective pixel area".

The toner cartridge 2034a stores therein black toner. The black toner is supplied to the developing roller 2033a. The toner cartridge 2034b stores therein cyan toner. The cyan toner is supplied to the developing roller 2033b. The toner cartridge 2034c stores therein magenta toner. The magenta toner is supplied to the developing roller 2033c. The toner cartridge 2034d stores therein yellow toner. The yellow toner is supplied to the developing roller 2033d.

As the developing roller 2033 rotates, a light and uniform coat of toner from the corresponding toner cartridge 2034 is applied to the surface of the developing roller 2033. The toner on the surface of the developing roller 2033, upon its contact with the surface of the corresponding photosensitive drum 2030, is transferred only to portions irradiated with the light of the surface and adheres thereto. Specifically, the developing roller 2033 causes the toner to adhere to the latent image formed on the surface of the corresponding photosensitive drum 2030 to thereby visualize the latent image.

The transfer belt 2040 is trained over a belt rotating mechanism, rotating in a predetermined direction. The transfer belt 2040 has an outer surface contacting the surface of each of the photosensitive drums 2030a, 2030b, 2030c, 2030d at a position opposite to the optical scanning device 2010. In addition, the outer surface of the transfer belt 2040 contacts the transfer roller 2042.

An image to which the toner adheres on the surface of the photosensitive drum 2030 (a toner image) is moved toward the transfer belt 2040 as the photosensitive drum 2030 rotates. The toner images of yellow, magenta, cyan, and black are then transferred, in sequence, onto the surface of the transfer belt 2040 at predetermined timing and are superimposed one on top of another to form a color image. The color image formed on the transfer belt 2040 is moved toward the transfer roller 2042 as the transfer belt 2040 rotates.

The paper feed tray 2060 stores therein recording sheets. The feed roller 2054 is disposed near the paper feed tray 2060. The feed roller 2054 takes up the recording sheet, one at a time, from the paper feed tray 2060 and conveys the recording sheet to the pair of registration rollers 2056.

The pair of registration rollers 2056 feeds the recording sheet toward a nip between the transfer belt 2040 and the transfer roller 2042 at predetermined timing. The color image on the transfer belt 2040 is transferred onto the recording sheet. The recording sheet onto which the color image has been transferred is fed to the fixing rollers 2050.

The fixing rollers 2050 apply heat and pressure to the recording sheet. This enables to fixing rollers 2050 to fix the toner on the recording sheet. The recording sheet on which the toner has been fixed is fed onto the discharge tray 2070 by way of the discharging rollers 2058 and stacked in sequence on the discharge tray 2070.

The cleaning unit 2031 removes toner remained (residual toner) on the surface of the photosensitive drum 2030. The surface of the photosensitive drum 2030 from which the residual toner has been removed returns to a position facing the charging device 2032 again.

Figure 2:
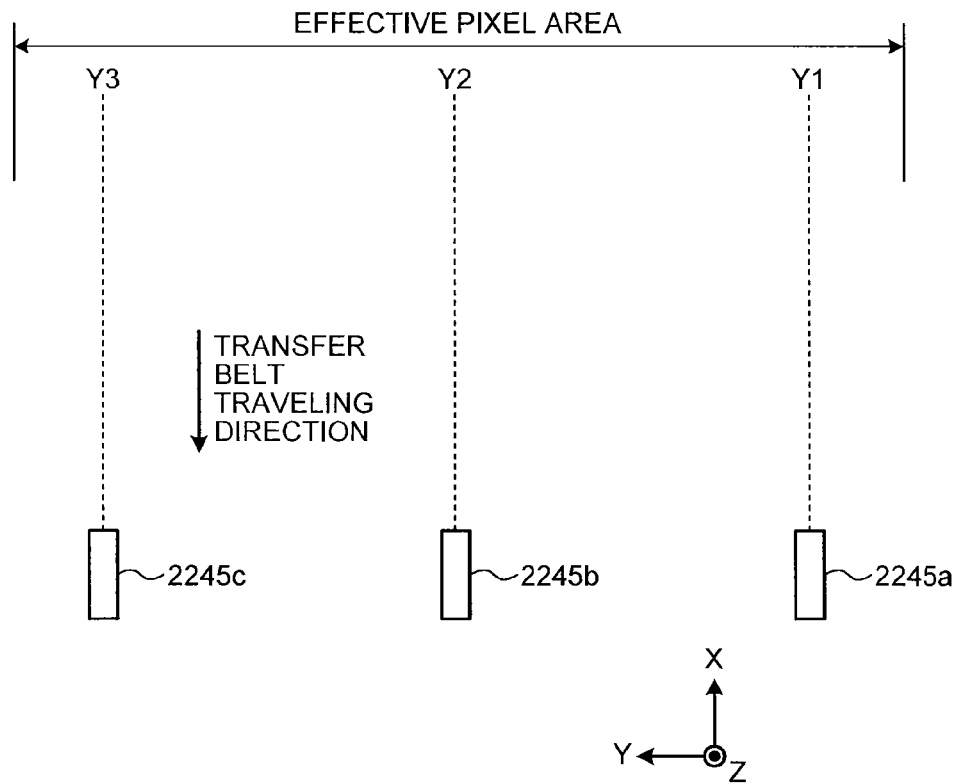
FIG. 2 is a diagram illustrating an exemplary arrangement of optical sensors 2245a, 2245b, 2245c.

The density detector 2245 is disposed at a position on the negative X side of the transfer belt 2040 (upstream of the fixing rollers 2050 in the traveling direction of the transfer belt 2040 and downstream of the four photosensitive drums 2030). Exemplarily, the density detector 2245 includes three optical sensors 2245a, 2245b, 2245c as illustrated in FIG. 2.

The optical sensor 2245a is disposed at a position facing a position near the end portion on the negative Y side within the effective pixel area in the transfer belt 2040 (on a first end side in the width direction of the transfer belt 2040). The optical sensor 2245c is disposed at a position facing a position near the end portion on the positive Y side within the effective pixel area in the transfer belt 2040 (on a second end side in the width direction of the transfer belt 2040). The optical sensor 2245b is disposed substantially at the center between the optical sensor 2245a and the optical sensor 2245c in the main-scanning direction (at a central position in the width direction of the transfer belt 2040). In this specification, in the main-scanning direction, the central position of the optical sensor 2245a is denoted Y1, the central position of the optical sensor 2245b is denoted Y2, and the central position of the optical sensor 2245c is denoted Y3.

Figure 3:
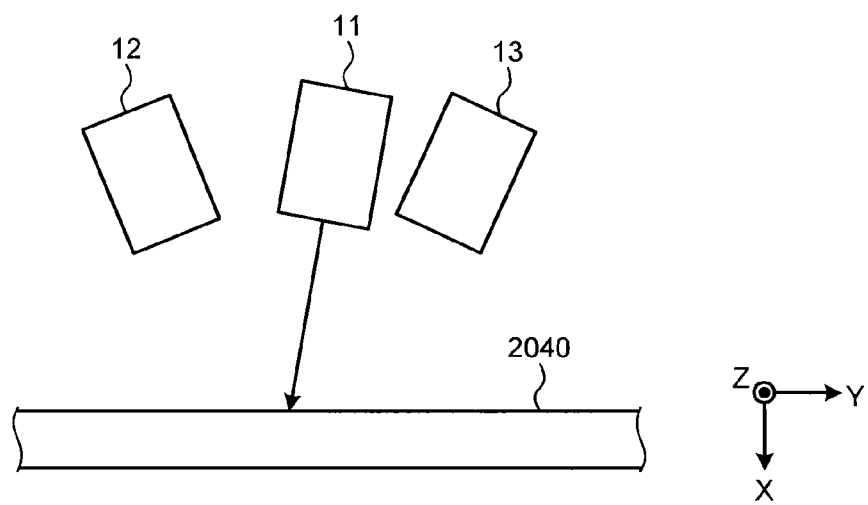
FIG. 3 is a diagram illustrating the configuration of the optical sensors 2245a, 2245b, 2245c.

The optical sensors 2245a, 2245b, 2245c each exemplarily include an LED 11, a regularly reflected light receiving element 12, and a diffusely reflected light receiving element 13 as illustrated in FIG. 3. Specifically, the LED 11 emits light (hereinafter referred to also as detection light) toward the transfer belt 2040. The regularly reflected light receiving element 12 receives light reflected regularly from the transfer belt 2040 or a toner pad on the transfer belt 2040. The diffusely reflected light receiving element 13 receives light reflected diffusely from the transfer belt 2040 or the toner pad on the transfer belt 2040. Each of the regularly reflected light receiving element 12 and the diffusely reflected light receiving element 13 outputs a signal corresponding to the amount of received light (photoelectric conversion signal).

The home position sensor 2246a detects a home position in rotation of the photosensitive drum 2030a. The home position sensor 2246b detects a home position in rotation of the photosensitive drum 2030b. The home position sensor 2246c detects a home position in rotation of the photosensitive drum 2030c. The home position sensor 2246d detects a home position in rotation of the photosensitive drum 2030d.

Figure 4:
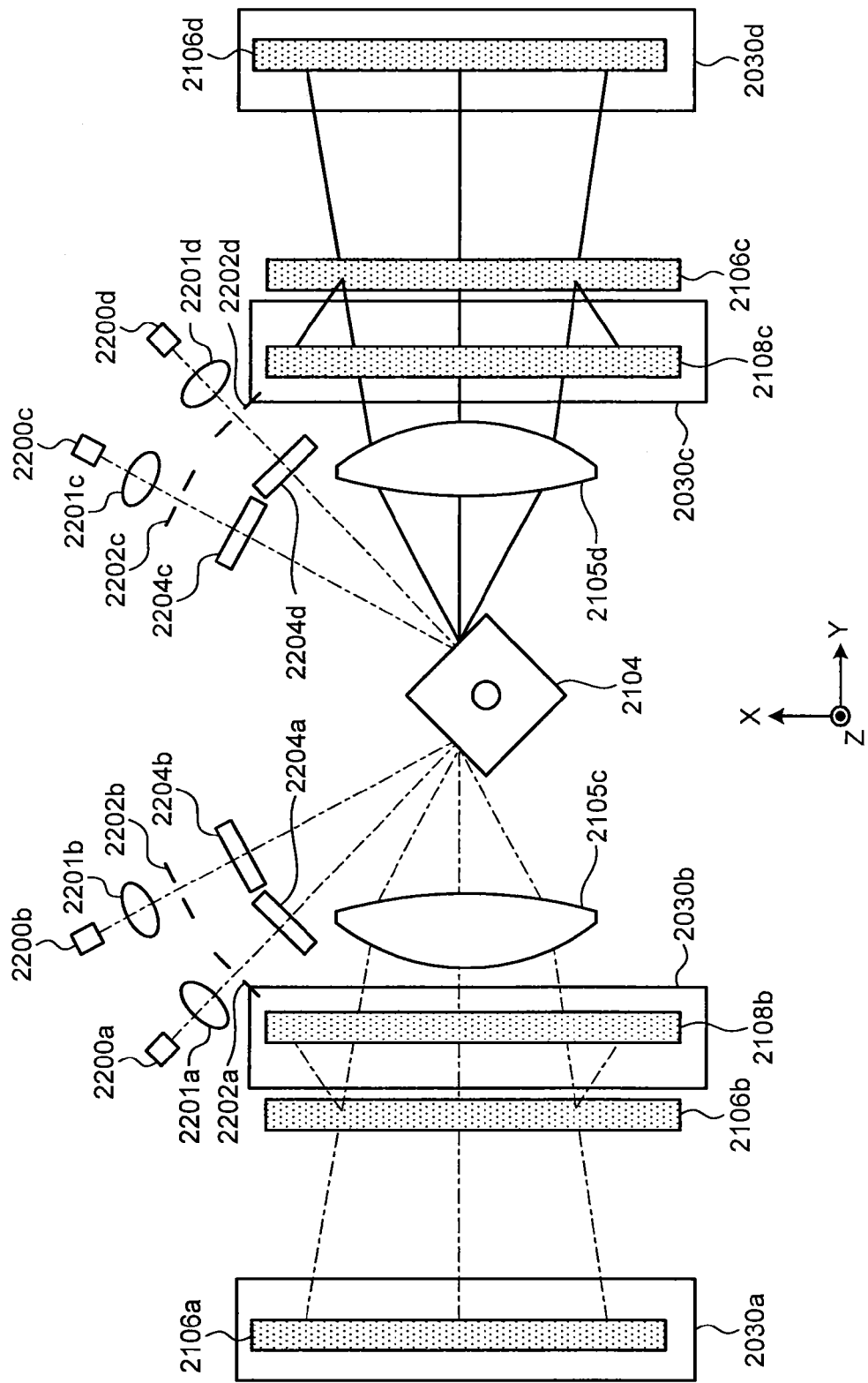
FIG. 4 is a diagram illustrating the configuration of an optical system of an optical scanning device 2010.
Figure 5:
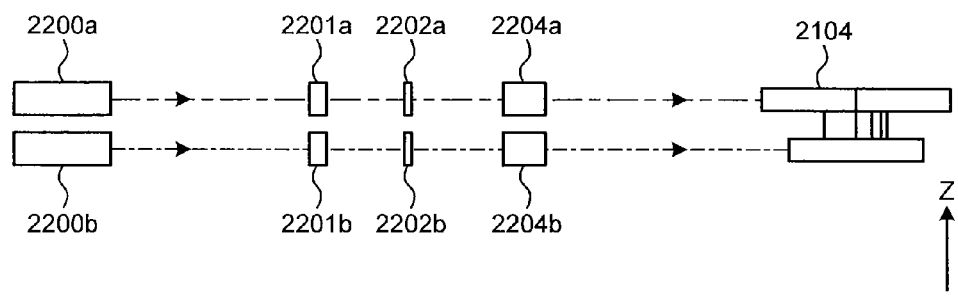
FIG. 5 is a diagram illustrating an exemplary optical path from a light source 2200a to a polygon mirror 2104 and an exemplary optical path from a light source 2200b to the polygon mirror 2104.
Figure 6:
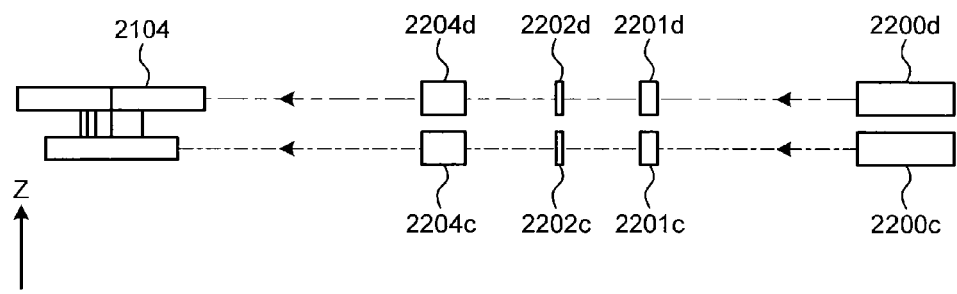
FIG. 6 is a diagram illustrating an exemplary optical path from a light source 2200c to the polygon mirror 2104 and an exemplary optical path from a light source 2200d to the polygon mirror 2104.
Figure 7:
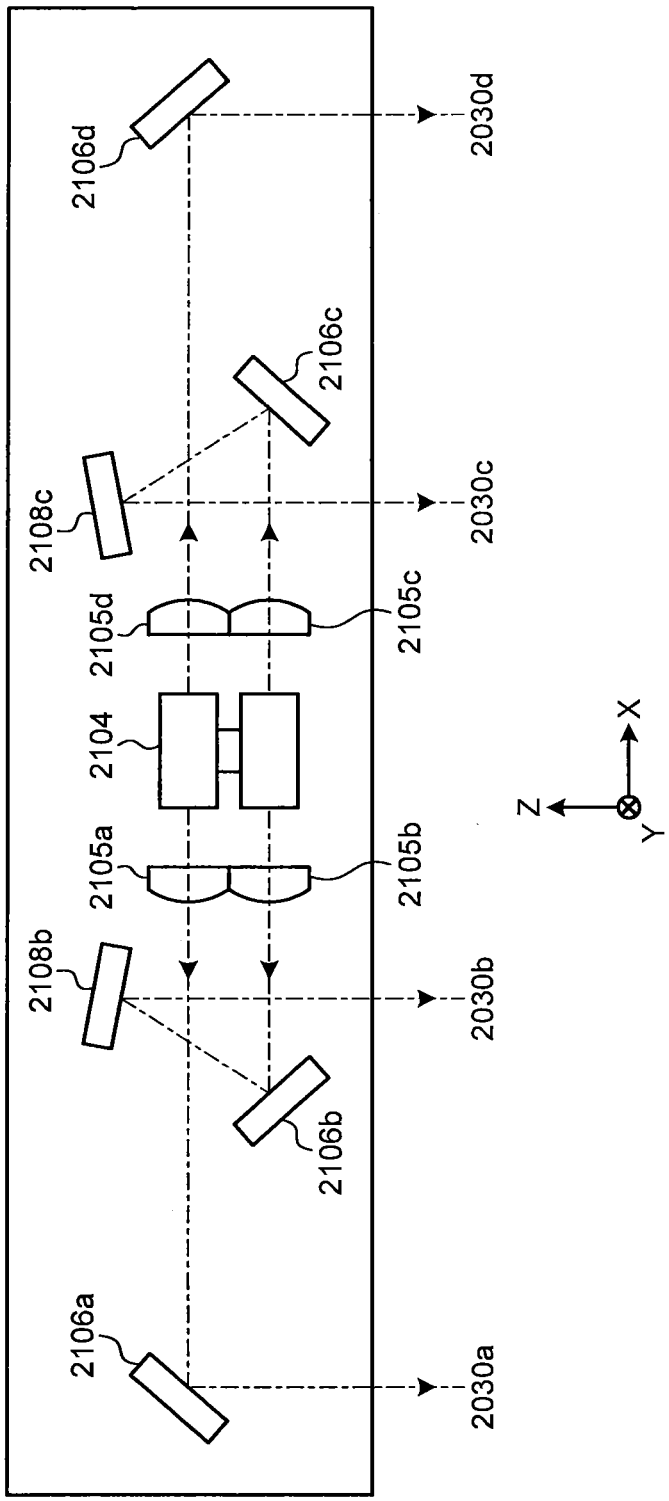
FIG. 7 is a diagram illustrating an exemplary optical path from the polygon mirror 2104 to photosensitive drums 2030.

FIG. 4 is a diagram illustrating the configuration of an optical system of the optical scanning device 2010. FIG. 5 is a diagram illustrating an exemplary optical path from a light source 2200a to a polygon mirror 2104 and an exemplary optical path from a light source 2200b to the polygon mirror 2104. FIG. 6 is a diagram illustrating an exemplary optical path from a light source 2200c to the polygon mirror 2104 and an exemplary optical path from a light source 2200d to the polygon mirror 2104. FIG. 7 is a diagram illustrating an exemplary optical path from the polygon mirror 2104 to the respective photosensitive drums 2030.

The configuration of the optical system of the optical scanning device 2010 will be described below. The optical scanning device 2010 includes as its optical system the four light sources 2200a, 2200b, 2200c, 2200d, four coupling lenses 2201a, 2201b, 2201c, 2201d, four aperture plates 2202a, 2202b, 2202c, 2202d, and four cylindrical lenses 2204a, 2204b, 2204c, 2204d. The optical scanning device 2010 further includes as the optical system the polygon mirror 2104, four scanning lenses 2105a, 2105b, 2105c, 2105d, and six folding mirrors 2106a, 2106b, 2106c, 2106d, 2108b, 2108c. These components are disposed at respective predetermined positions in an optical housing.

The optical scanning device 2010 still further includes an electric circuit which will be described with reference to FIG. 8 and onward.

The light sources 2200a, 2200b, 2200c, 2200d each include a surface emitting laser array in which a plurality of light emitting elements are arrayed two-dimensionally. The light emitting elements of the surface emitting laser array are arrayed so as to be equidistant from each other when all light emitting elements are orthographically projected onto a virtual line extending in the direction corresponding to the sub-scanning direction. The light sources 2200a, 2200b, 2200c, 2200d are, for an example, each an exemplary vertical-cavity surface-emitting laser (VCSEL).

The coupling lens 2201a is disposed on the light path of a light beam emitted from the light source 2200a, changing the light beam passing therethrough to a substantially parallel light beam. The coupling lens 2201b is disposed on the light path of a light beam emitted from the light source 2200b, changing the light beam passing therethrough to a substantially parallel light beam. The coupling lens 2201c is disposed on the light path of a light beam emitted from the light source 2200c, changing the light beam passing therethrough to a substantially parallel light beam. The coupling lens 2201d is disposed on the light path of a light beam emitted from the light source 2200d, changing the light beam passing therethrough to a substantially parallel light beam.

The aperture plate 2202a has an aperture and shapes the light beam that has passed through the coupling lens 2201a. The aperture plate 2202b has an aperture and shapes the light beam that has passed through the coupling lens 2201b. The aperture plate 2202c has an aperture and shapes the light beam that has passed through the coupling lens 2201c. The aperture plate 2202d has an aperture and shapes the light beam that has passed through the coupling lens 2201d.

The cylindrical lens 2204a focuses the light beam that has passed through the aperture of the aperture plate 2202a onto a position near a deflecting reflection surface of the polygon mirror 2104 along the Z-axis direction. The cylindrical lens 2204b focuses the light beam that has passed through the aperture of the aperture plate 2202b onto a position near the deflecting reflection surface of the polygon mirror 2104 along the Z-axis direction. The cylindrical lens 2204c focuses the light beam that has passed through the aperture of the aperture plate 2202c onto a position near the deflecting reflection surface of the polygon mirror 2104 along the Z-axis direction. The cylindrical lens 2204d focuses the light beam that has passed through the aperture of the aperture plate 2202d onto a position near the deflecting reflection surface of the polygon mirror 2104 along the Z-axis direction.

An optical system comprising the coupling lens 2201a, the aperture plate 2202a, and the cylindrical lens 2204a is a pre-deflector optical system for the K station. An optical system comprising the coupling lens 2201b, the aperture plate 2202b, and the cylindrical lens 2204b is a pre-deflector optical system for the C station. An optical system comprising the coupling lens 2201c, the aperture plate 2202c, and the cylindrical lens 2204c is a pre-deflector optical system for the M station. An optical system comprising the coupling lens 2201d, the aperture plate 2202d, and the cylindrical lens 2204d is a pre-deflector optical system for the Y station.

The polygon mirror 2104 comprises a four-face mirror having a two-stage structure rotating about an axis extending in parallel with the Z-axis, each face of the polygon mirror 2104 assuming a deflecting reflection surface. The polygon mirror 2104 is disposed such that the four-face mirror of a first stage (lower stage) deflects the light beam from the cylindrical lens 2204b and the light beam from the cylindrical lens 2204c, while the four-face mirror of a second stage (upper stage) deflects the light beam from the cylindrical lens 2204a and the light beam from the cylindrical lens 2204d.

In addition, the light beam from the cylindrical lens 2204a and the light beam from the cylindrical lens 2204b are deflected to the negative X side of the polygon mirror 2104, while the light beam from the cylindrical lens 2204c and the light beam from the cylindrical lens 2204d are deflected to the positive X side of the polygon mirror 2104.

The scanning lenses 2105a, 2105b, 2105c, 2105d each have an optical power that converges the light beam on a position near the photosensitive drum 2030 and an optical power that causes an optical spot to move on the surface of the photosensitive drum 2030 in the main-scanning direction at a constant speed as the polygon mirror 2104 rotates.

The scanning lens 2105a and the scanning lens 2105b are disposed on the negative X side of the polygon mirror 2104.

The scanning lens 2105c and the scanning lens 2105d are disposed on the positive X side of the polygon mirror 2104.

The scanning lens 2105a and the scanning lens 2105b are stacked in the Z-axis direction. The scanning lens 2105b faces the four-face mirror of the first stage. The scanning lens 2105a faces the four-face mirror of the second stage.

The scanning lens 2105c and the scanning lens 2105d are stacked in the Z-axis direction. The scanning lens 2105c faces the four-face mirror of the first stage. The scanning lens 2105d faces the four-face mirror of the second stage.

The photosensitive drum 2030a is irradiated, via the scanning lens 2105a and the folding mirror 2106a, with the light beam from the cylindrical lens 2204a deflected by the polygon mirror 2104, which forms an optical spot. The optical spot moves in the longitudinal direction of the photosensitive drum 2030a as the polygon mirror 2104 rotates. Specifically, the optical spot scans the surface of the photosensitive drum 2030a. The direction in which the optical spot moves at this time is the "main-scanning direction" in the photosensitive drum 2030a and the direction in which the photosensitive drum 2030a rotates is the "sub-scanning direction" in the photosensitive drum 2030a.

The photosensitive drum 2030b is irradiated, via the scanning lens 2105b, the folding mirror 2106b, and the folding mirror 2108b, with the light beam from the cylindrical lens 2204b deflected by the polygon mirror 2104, which forms an optical spot. The optical spot moves in the longitudinal direction of the photosensitive drum 2030b as the polygon mirror 2104 rotates. Specifically, the optical spot scans the surface of the photosensitive drum 2030b. The direction in which the optical spot moves at this time is the "main-scanning direction" in the photosensitive drum 2030b and the direction in which the photosensitive drum 2030b rotates is the "sub-scanning direction" in the photosensitive drum 2030b.

The photosensitive drum 2030c is irradiated, via the scanning lens 2105c, the folding mirror 2106c, and the folding mirror 2108c, with the light beam from the cylindrical lens 2204c deflected by the polygon mirror 2104, which forms an optical spot. The optical spot moves in the longitudinal direction of the photosensitive drum 2030c as the polygon mirror 2104 rotates. Specifically, the optical spot scans the surface of the photosensitive drum 2030c. The direction in which the optical spot moves at this time is the "main-scanning direction" in the photosensitive drum 2030c and the direction in which the photosensitive drum 2030c rotates is the "sub-scanning direction" in the photosensitive drum 2030c.

The photosensitive drum 2030d is irradiated, via the scanning lens 2105d and the folding mirror 2106d, with the light beam from the cylindrical lens 2204d deflected by the polygon mirror 2104, which forms an optical spot. The optical spot moves in the longitudinal direction of the photosensitive drum 2030d as the polygon mirror 2104 rotates. Specifically, the optical spot scans the surface of the photosensitive drum 2030d. The direction in which the optical spot moves at this time is the "main-scanning direction" in the photosensitive drum 2030d and the direction in which the photosensitive drum 2030d rotates is the "sub-scanning direction" in the photosensitive drum 2030d.

The folding mirrors 2106a, 2106b, 2106c, 2106d, 2108b, 2108c are disposed such that each has an optical path length between the polygon mirror 2104 and the corresponding photosensitive drum 2030 identical to each other and the position of incidence and the incident angle of the light beam at the corresponding photosensitive drum 2030 are identical to each other.

The optical system disposed along the optical path between the polygon mirror 2104 and the photosensitive drum 2030 is also referred to as a scanning optical system. In the embodiment, the scanning lens 2105a and the folding mirror 2106a constitute a scanning optical system for the K station. Similarly, the scanning lens 2105b and the two folding mirrors 2106b, 2108b constitute a scanning optical system for the C station. The scanning lens 2105c and the two folding mirrors 2106c, 2108c constitute a scanning optical system for the M station. The scanning lens 2105d and the folding mirror 2106d constitute a scanning optical system for the Y station. In each of these scanning optical systems, the scanning lens 2105a, 2105b, 2105c, or 2105d may comprise a plurality of lenses.

Figure 8:
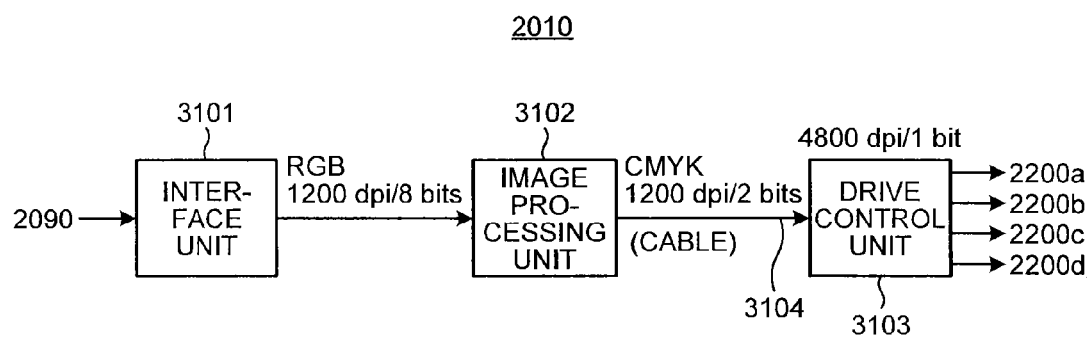
FIG. 8 is a diagram illustrating the configuration of an electrical system of the optical scanning device 2010.

FIG. 8 is a diagram illustrating the configuration of an electrical system of the optical scanning device 2010. The optical scanning device 2010 includes as its electrical system an interface unit 3101, an image processing unit 3102, and a drive control unit 3103.

The interface unit 3101 acquires, from the printer control device 2090, image data transferred from the host device (e.g., a computer). The interface unit 3101 transfers the acquired image data to the image processing unit 3102 downstream thereof.

In the embodiment, the interface unit 3101 acquires image data in the RGB format having a resolution of 1200 dpi and consisting of eight bits and transfers the image data to the image processing unit 3102.

The image processing unit 3102, having acquired the image data from the interface unit 3101, converts the image data to color image data corresponding to the applicable printing system. Exemplarily, the image processing unit 3102 converts the image data in the RGB format to image data of the tandem type (CMYK format). In addition to the data format conversion, the image processing unit 3102 performs image processing with the aim of, for example, improving image quality of the image data.

In this embodiment, the image processing unit 3102 outputs image data in the CMYK format having a resolution of 1200 dpi and consisting of two bits. The image data output from the image processing unit 3102 may have any resolution other than 1200 dpi. The resolution of the image data output from the image processing unit 3102 is referred to as a first resolution.

The drive control unit 3103 acquires, from the image processing unit 3102, image data having the first resolution, and converts the image data to color image data having a second resolution corresponding to light source driving. The second resolution is higher than the first resolution. In this embodiment, the drive control unit 3103 converts the image data to one in the CMYK format having a resolution of 4800 dpi and consisting of one bit.

Additionally, the drive control unit 3103 modulates the image data to a clock signal that indicates pixel light-emitting timing, thus generating an independent modulation signal for each color. The drive control unit 3103 drives and causes each of the light sources 2200a, 2200b, 2200c, 2200d to emit light according to the modulation signal associated with the corresponding color.

The drive control unit 3103 is exemplarily a single-chip IC circuit disposed near the light sources 2200a, 2200b, 2200c, 2200d. The image processing unit 3102 and the interface unit 3101 are disposed farther away from the light sources 2200a, 2200b, 2200c, 2200d relative to the drive control unit 3103. The image processing unit 3102 and the drive control unit 3103 are connected with a cable 3104.

The optical scanning device 2010 having the arrangements as described above can form a latent image by causing the light sources 2200a, 2200b, 2200c, 2200d to emit light corresponding to the image data.

Figure 9:
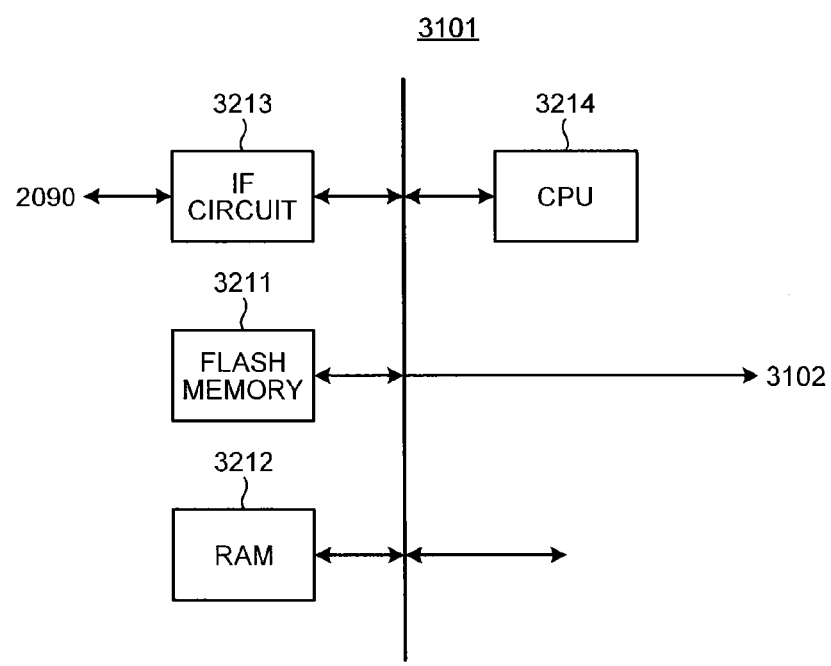
FIG. 9 is a diagram illustrating the configuration of an interface unit 3101.

FIG. 9 is a diagram illustrating the configuration of the interface unit 3101. The interface unit 3101 exemplarily includes a flash memory 3211, a RAM 3212, an IF circuit 3213, and a CPU 3214. The flash memory 3211, the RAM 3212, the IF circuit 3213, and the CPU 3214 are connected to each other by a bus.

The flash memory 3211 stores therein a computer program to be executed by the CPU 3214 and various types of data required by the CPU 3214 for executing the program. The RAM 3212 is a work storage area used by the CPU 3214 to execute the program. The IF circuit 3213 performs bi-directional communications with the printer control device 2090.

The CPU 3214 operates according to the program stored in the flash memory 3211, thus generally controlling the optical scanning device 2010. The interface unit 3101 configured as described above transfers the image data (in the RGB format having a resolution of 1200 dpi and consisting of eight bits) transmitted from the printer control device 2090 to the image processing unit 3102.

Figure 10:
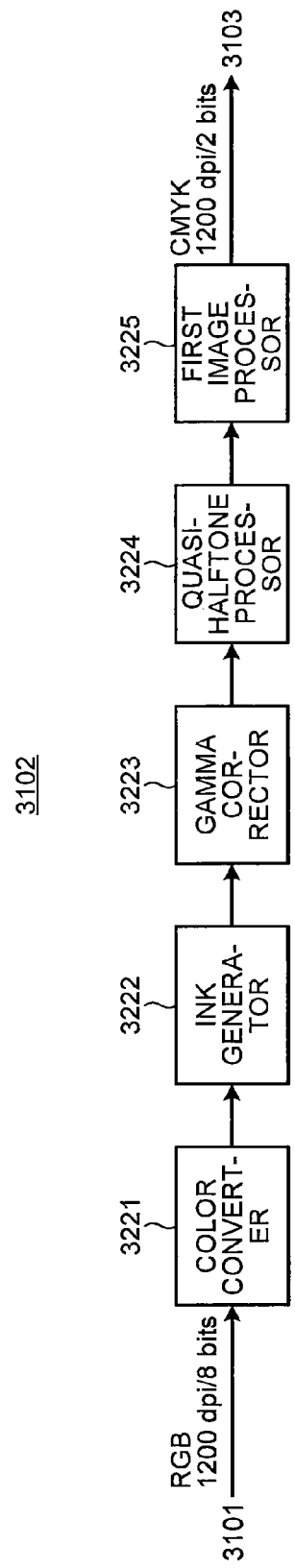
FIG. 10 is a diagram illustrating the configuration of an image processing unit 3102.

FIG. 10 is a diagram illustrating the configuration of the image processing unit 3102. The image processing unit 3102 includes a color converter 3221, an ink generator 3222, a gamma corrector 3223, a quasi-halftone processor 3224, and a first image processor 3225.

The color converter 3221 converts the image data in the RGB format to image data in a CMY format. The ink generator 3222 generates a black component from the image data in the CMY format generated by the color converter 3221 to thereby generate image data in the CMYK format.

The gamma corrector 3223 uses, for example, a table to subject the level of each color to linear conversion. The quasi-halftone processor 3224 uses, for example, a dithering technique to process halftones, thereby reducing the number of gradations of the image data.

The first image processor 3225 performs image processing on the image data output from the quasi-halftone processor 3224 with the aim of, for example, improving image quality. The first image processor 3225 uses filtering, pattern matching, or the like to detect, within the image, a specific area for which image quality is to be improved and performs predetermined image processing on the detected image area.

Specific examples of the processing performed by the first image processor 3225 will further be described in detail with reference to FIGS. 12A, 12B, 13A, 13B, and 14. In addition, the first image processor 3225 performs the image processing on an area different from that processed in image processing performed by the drive control unit 3103 at a later stage and using parameters different from those used in the image processing performed by the drive control unit 3103. The differences will be described in detail later.

The image processing unit 3102 as described above outputs the image data in the CMYK format having the first resolution (e.g., 1200 dpi) and consisting of two bits to the drive control unit 3103. The image processing unit 3102 may be achieved by hardware partially or entirely or by a CPU executing a software program.

Figure 11:
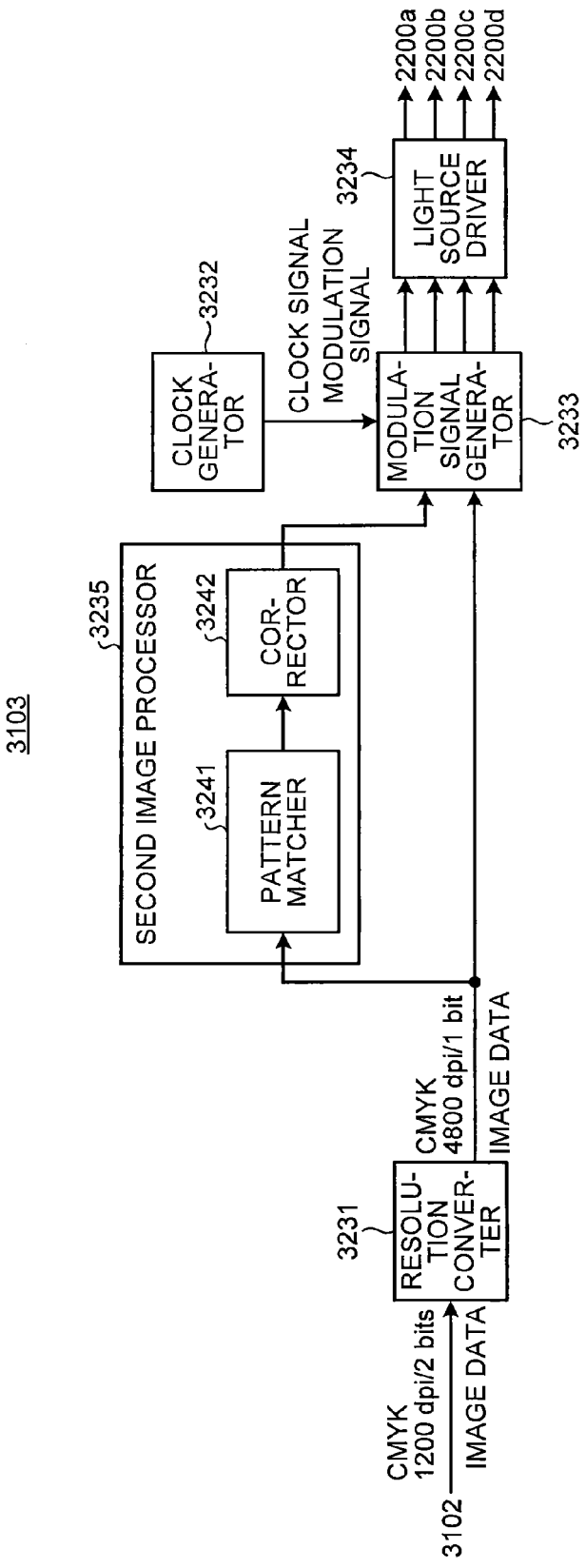
FIG. 11 is a diagram illustrating the configuration of a drive control unit 3103.

FIG. 11 is a diagram illustrating the configuration of the drive control unit 3103. The drive control unit 3103 includes a resolution converter 3231, a clock generator 3232, a modulation signal generator 3233, a light source driver 3234, and a second image processor 3235.

The resolution converter 3231 acquires image data having the first resolution from the image processing unit 3102 and converts the image data to image having the second resolution that is higher than the first resolution. In the embodiment, the resolution converter 3231 converts the image data in the CMYK format having a resolution of 1200 dpi and consisting of two bits to image data in the CMYK format having a resolution of 4800 dpi and consisting of one bit.

Specifically, the resolution converter 3231 quadruples the resolution by converting one dot (two bits (four gradations)) of 1200-dpi image data to four dots (one bit) of 4800-dpi image data. It is noted that the resolution converter 3231 may convert image data to that of any gradations, as long as the conversion process converts image data with a resolution N (N being a natural number) to image data with a resolution of m×N (m being 2 or any other natural number more than 2).

The clock generator 3232 generates a clock signal that indicates the pixel light-emitting timing. The clock signal can be phase-modulated with a resolution of ⅛ clock, for example.

The modulation signal generator 3233 modulates image data of each color to a corresponding clock signal to thereby generate an independent modulation signal for the color. In the embodiment, the modulation signal generator 3233 generates a modulation signal for each color of C, M, Y, and K. Additionally, the modulation signal generator 3233 modulates, for each color, the image data to a clock signal in synchronism with write start timing based on the angular position of rotation of the photosensitive drum 2030. The modulation signal generator 3233 then supplies the independent modulation signal for each color to the light source driver 3234.

The light source driver 3234 drives a corresponding one of the light sources 2200a, 2200b, 2200c, 2200d according to the independent modulation signal for each color output from the modulation signal generator 3233. This enables the light source driver 3234 to make each of the light sources 2200a, 2200b, 2200c, 2200d emit light with an intensity corresponding to the modulation signal.

The second image processor 3235 performs image processing for the image data having the second resolution (e.g., 4800 dpi) to be modulated to a modulation signal. The second image processor 3235 exemplarily includes a pattern matcher 3241 and a corrector 3242.

The pattern matcher 3241 detects, of the image data, an image area to be subject to processing by the second image processor 3235. Exemplarily, the pattern matcher 3241 detects from the image data having the second resolution an area with a space component close to that of a previously registered image pattern. Alternatively, the pattern matcher 3241 may perform filtering for the image data having the second resolution to thereby detect an area with a frequency component close to that of a previously registered image pattern.

The corrector 3242 corrects the detected image area through image processing. For example, the corrector 3242 may perform image processing for the image data before modulation. Alternatively, the corrector 3242 may even perform image processing for the image data by adjusting signal intensity by, for example, changing the pulse width of the modulation signal during the modulation.

As briefly noted earlier, the first image processor 3225 of the image processing unit 3102 and the second image processor 3235 of the drive control unit 3103 perform image processing using processing parameters different from each other or relative to areas subject to image data processing different from each other.

For example, the first image processor 3225 performs image processing rendering a coarseness level coarser than a predetermined coarseness level for the image data having the first resolution (e.g., 1200 dpi). At this time, the second image processor 3235 performs image processing rendering a fineness level finer than a predetermined fineness level for the image data having the second resolution (e.g., 4800 dpi). This allows the first image processor 3225 to perform a coarse adjustment and the second image processor 3235 to perform a fine adjustment relative to an identical image area.

Exemplarily, the first image processor 3225 performs image processing for objects (e.g., characters or graphics) equal in size to or larger in size than a predetermined size on the image data having the first resolution (e.g., 1200 dpi). In this case, the second image processor 3235 performs image processing for objects (e.g., characters or graphics) smaller in size than the predetermined size, the objects not being subject to the image processing by the first image processor 3225. Exemplarily, the second image processor 3235 performs its image processing for at least part of a pattern of predetermined characters having a predetermined size or smaller. This allows the first image processor 3225 to perform its image processing for a coarse image area and the second image processor 3235 to perform the same image processing as that of the first image processor 3225 for a fine image area.

Thus, the color printer 2000 performs image processing for a minute pattern or fine image processing on high-resolution image data, which enables the color printer 2000 to form an image with high quality. Furthermore, the color printer 2000 performs image processing for a relatively large pattern or relatively coarse image processing on low-resolution image data. This reduces processing load on the drive control unit 3103, while reducing the amount of data transferred from the image processing unit 3102 to the drive control unit 3103.

In detecting the object, such as a character or a graphic figure, to be subjected to image processing, if it is difficult for the first image processor 3225 and the second image processor 3235 to detect an entire object from the image data, at least part of the character or graphic figure may be detected by, for example, pattern matching. For example, the first image processor 3225 and the second image processor 3235 register at least a characteristic shape pattern of a predetermined character or graphic figure in advance and detect the whole or part of the character by pattern matching. The first image processor 3225 and the second image processor 3235 then perform the image processing on the detected whole or part of the character.

FIG. 12A is a diagram illustrating an exemplary 5-point white-on-black inverted character and exemplary enlarging steps in units of 1200 dpi. FIG. 12B is a diagram illustrating an exemplary 3-point white-on-black inverted character and exemplary enlarging steps in units of 4800 dpi. The first image processor 3225 and the second image processor 3235 detect, for example, a white (blank) portion that is represented by blanking out the shape of an object (e.g., a character or a graphic figure) from a background color as illustrated in FIGS. 12A and 12B through matching between the space component or the frequency component of the image data and a previously registered pattern. Then, the first image processor 3225 and the second image processor 3235 perform steps of enlarging a white (blank) part in the detected white (blank) portion.

This enables the first image processor 3225 and the second image processor 3235 to form a high-quality image by minimizing a disadvantage in electrophotographic printing of aggravated reproducibility due to collapsed fine lines.

In performing the steps of enlarging the white part, the first image processor 3225 enlarges, relative to the white-on-black inverted character of a predetermined first size or larger (e.g., 5 points or larger), the white part in units of the first resolution (e.g., in units of 1200 dpi), but not relative to the white-on-black inverted character smaller than the first size (e.g., smaller than 5 points), as illustrated in FIG. 12A.

Alternatively, as illustrated in FIG. 12B, the second image processor 3235 enlarges, relative to the white-on-black inverted character not subjected to the image processing performed by the first image processor 3225, specifically, the white-on-black inverted character smaller than the first size (e.g., smaller than 5 points), the white part in units of the second resolution (e.g., in units of 4800 dpi), but not relative to the white-on-black inverted character equal to or larger than the first size (e.g., 5 points or larger).

This allows the first image processor 3225 to perform its image processing for a relatively coarse image area and the second image processor 3235 to perform the same image processing as that of the first image processor 3225 for a relatively fine image area. It is noted that, in this case, the second image processor 3235 may enlarge the white part by, for example, changing the pulse width of the modulation signal of parts surrounding the white part.

FIG. 13A is a diagram illustrating exemplary thinning steps in units of 1200 dpi. FIG. 13B is a diagram illustrating exemplary thinning steps in units of 4800 dpi. Exemplarily, the first image processor 3225 detects a line-shaped object as illustrated in FIG. 13A through matching between the space component or the frequency component of the image data and a previously registered pattern in units of the first resolution (e.g., in units of 1200 dpi). The first image processor 3225 then performs a step of changing the width of the line (e.g., thinning) in units of the first resolution (e.g., in units of 1200 dpi) relative to the detected line-shaped object. The second image processor 3235 detects a line-shaped object as illustrated in FIG. 13B through matching between the space component or the frequency component of the image data and a previously registered pattern in units of the second resolution (e.g., in units of 4800 dpi). The second image processor 3235 then performs a step of changing the width of the line (e.g., thinning) in units of the second resolution (e.g., in units of 4800 dpi) relative to the detected line-shaped object.

This enables the first image processor 3225 and the second image processor 3235 to form a high-quality image by minimizing a disadvantage of character thickening resulting from electrophotographic printing.

In performing the step of changing the width of the line as described above, the first image processor 3225 changes the width of a line with a predetermined width or larger (e.g., 5 dots or more at 1200 dpi), but not for a line with a width smaller than the predetermined width. The second image processor 3235 changes, relative to the line with a width not subjected to the step performed by the first image processor 3225, specifically, the width of the line with a width smaller than the predetermined width (e.g., a line of less than 20 dots at 4800 dpi), but not for a line with the predetermined width or larger.

This allows the first image processor 3225 to perform its image processing for a relatively coarse image area and the second image processor 3235 to perform the same image processing as that of the first image processor 3225 for a relatively fine image area. It is noted that, in this case, the second image processor 3235 may narrow edges of the line by, for example, changing the pulse width of the modulation signal of line edge portions.

Figure 14:
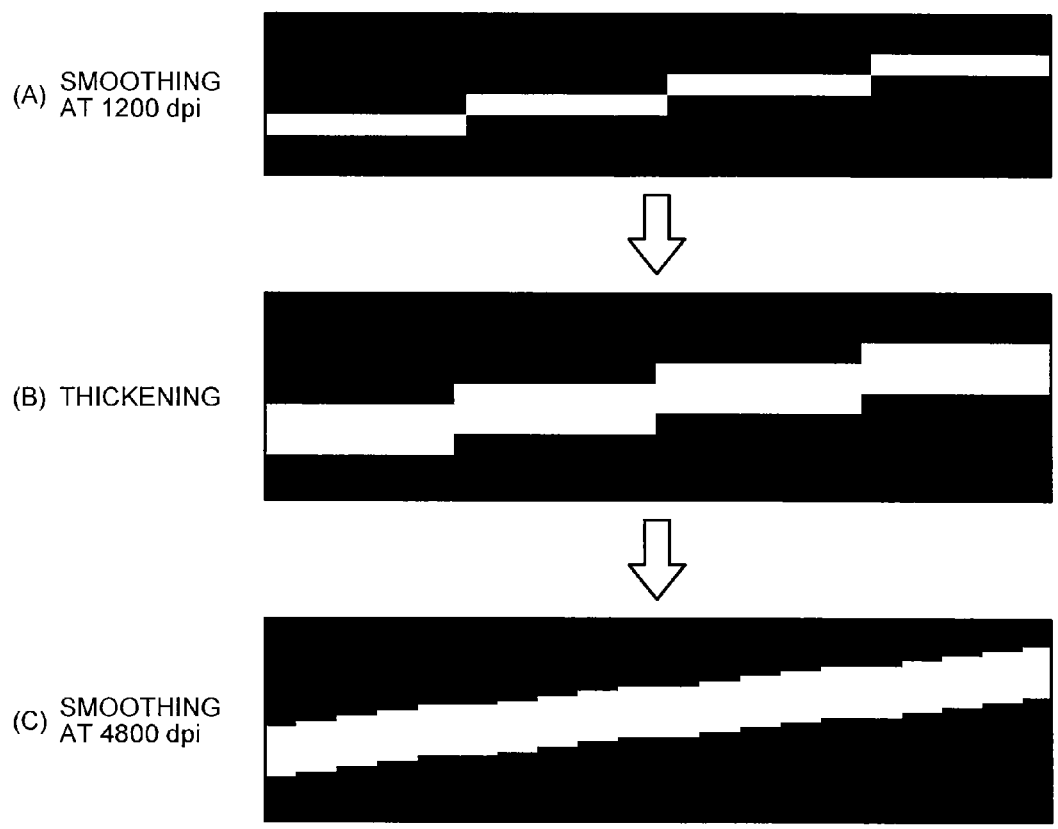
FIG. 14 is a diagram illustrating exemplary smoothing steps.

FIG. 14 is a diagram illustrating exemplary smoothing steps. As illustrated in FIG. 14, the first image processor 3225 and the second image processor 3235 exemplarily detect a line-shaped object drawn in an oblique direction relative to an array of dots of image data through matching between the space component or the frequency component of the image data and a previously registered pattern. The first image processor 3225 and the second image processor 3235 then performs a smoothing step that smoothes edges of the detected oblique line.

This enables the first image processor 3225 and the second image processor 3235 to improve line reproducibility, thereby forming a high-quality image.

In performing the smoothing step for the oblique line as described above, the first image processor 3225 smoothes the oblique line in units of predetermined pixels (e.g., one dot at 1200 dpi). The second image processor 3235 smoothes the oblique line in units of pixels (e.g., one dot at 4800 dpi) with which an oblique line that cannot be smoothed in units of pixels applicable to the first image processor 3225 can be smoothed.

Assume, for example, that the first image processor 3225 smoothes the oblique line in units of one dot at 1200 dpi as illustrated by figure (A) in FIG. 14. In this case, the second image processor 3235 first thickens the oblique line as illustrated by figure (B) in FIG. 14 and then smoothes the thickened oblique line in units of one dot at 4800 dpi as illustrated by figure (C) in FIG. 14.

As such, the first image processor 3225 and the second image processor 3235 can further improve line reproducibility by performing the thickening and smoothing steps for the oblique line. This allows the first image processor 3225 to perform coarse adjustments and the second image processor 3235 to perform fine adjustments relative to the same image area.

Figure 15:
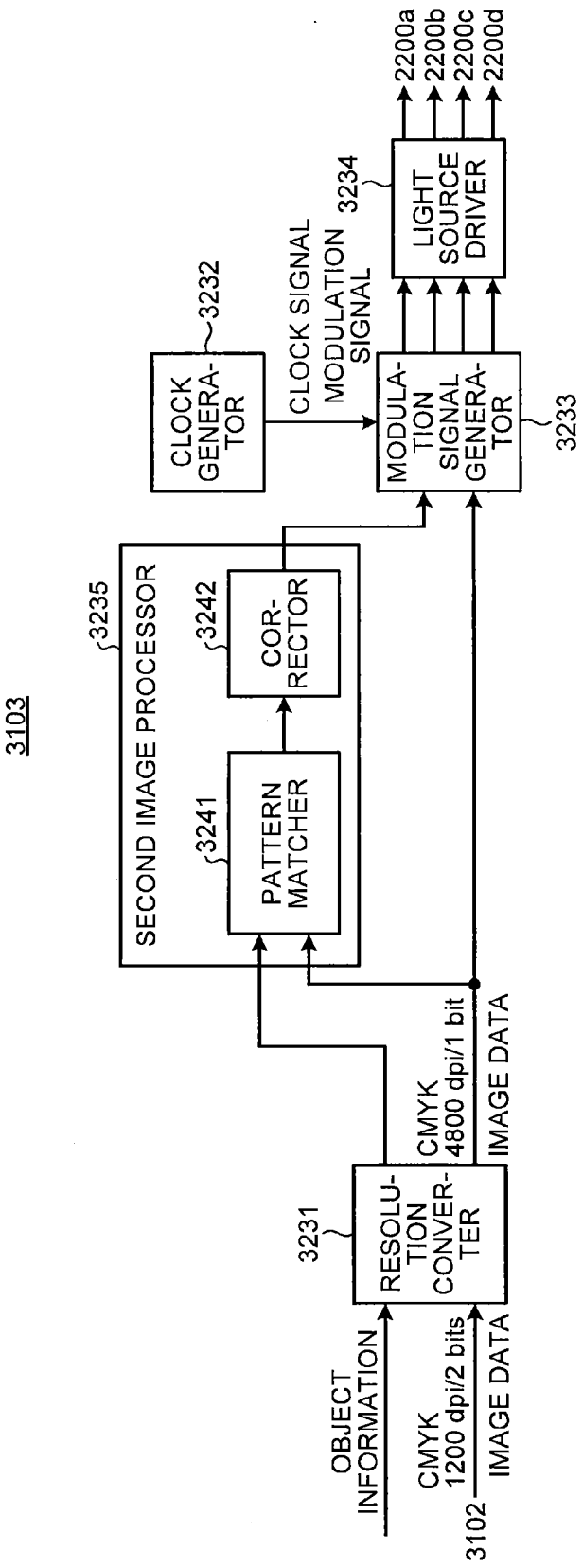
FIG. 15 is a diagram illustrating a modification of the drive control unit 3103 of the optical scanning device 2010.

FIG. 15 is a diagram illustrating a modification of the drive control unit 3103 of the optical scanning device 2010. The drive control unit 3103 may receive object information together with the image data from the image processing unit 3102. The object information indicates, for each image area (e.g., for each pixel dot) of the image data, the type of an object of the image area.

If, for example, the corresponding dot is part of a character, the object information indicates an attribute that represents a "character". Alternatively, if the corresponding dot is part of a graphic figure, the object information indicates an attribute that represents a "graphic figure". If the corresponding dot is part of a photo, the object information indicates an attribute that represents a "photo".

According to a specific detail of the received object information, the second image processor 3235 determines whether to perform image processing. If, for example, the received object information indicates the attribute that represents a "character", and if, for example, the area in question is subject to processing for a white-on-black inverted character, the second image processor 3235 performs the image processing. If the received object information indicates an attribute representing one other than a character, the second image processor 3235 does not perform image processing for the area subject to processing for the white-on-black inverted character.

As described above, the second image processor 3235 can improve image quality with even higher accuracy by determining whether to perform image processing using the object information.

The present invention achieves an advantageous effect of performing image processing at high resolutions without increasing the amount of optical image data to be transferred.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that forms an image according to light emitted from a light source, the image forming apparatus comprising:
   circuitry including
   a first image processor configured to perform image processing on image data having a first resolution and output the resulting image data;
   a resolution converter configured to acquire the image data having the first resolution output from the first image processor and convert the image data to image data having a second resolution that is higher than the first resolution;
   a modulation signal generator configured to modulate the image data having the second resolution according to a clock signal to generate a modulation signal;
   a light source driver configured to drive the light source according to the modulation signal; and
   a second image processor configured to perform image processing on the image data having the second resolution to be modulated to the modulation signal, wherein
   the second image processor acquires object information that indicates a type of an object in the image data and determines whether or not to perform image processing based on the acquired object information,
   the first image processor performs image processing for at least part of a pattern of an object having a predetermined size or larger on the image data having the first resolution, and
   the second image processor performs image processing for at least part of a pattern of an object smaller than the predetermined size on the image data having the second resolution.

2. The image forming apparatus according to claim 1, wherein
   the first image processor performs image processing that renders a coarseness level coarser than a predetermined coarseness level on the image data having the first resolution, and
   the second image processor performs image processing that renders a fineness level finer than a predetermined fineness level on the image data having the second resolution.

3. The image forming apparatus according to claim 1, wherein the second image processor performs image processing for at least part of a pattern of a predetermined character having the predetermined size or smaller.

4. The image forming apparatus according to claim 1, wherein the second image processor
   detects, from the image data having the second resolution, a white-on-black inverted portion represented by blanking out an object smaller than a first size, and
   enlarges a white part of the detected white-on-black inverted portion.

5. The image forming apparatus according to claim 4, wherein the second processor does not perform image processing when the acquired object information indicates the type of object is a type other than a character type.

6. The image forming apparatus according to claim 1, wherein
   the second image processor detects, from the image data having the second resolution, a line having a predetermined width or smaller and changes a width of the detected line.

7. The image forming apparatus according to claim 1, wherein the second image processor
   detects, from the image data having the second resolution, a line having a predetermined width or smaller, the line being drawn in an oblique direction relative to an array of dots of the image data, and
   smoothes edges of the detected line.

8. The image forming apparatus according to claim 1, wherein the light source includes a vertical-cavity surface-emitting laser.

9. An image forming method for forming an image according to light emitted from a light source, the image forming method comprising:
   performing, via a first image processor, image processing on image data having a first resolution and outputting the resulting image data;
   acquiring the image data having the first resolution output from the first image processor;
   converting the image data to image data having a second resolution that is higher than the first resolution;
   modulating the image data having the second resolution according to a clock signal to generate a modulation signal;
   driving the light source according to the modulation signal; and
   performing, via a second image processor, image processing on the image data having the second resolution to be modulated to the modulation signal, wherein
   the second image processor acquires object information that indicates a type of an object in the image data and determines whether or not to perform image processing based on the acquired object information,
   the first image processor performs image processing for at least part of a pattern of an object having a predetermined size or larger on the image data having the first resolution, and
   the second image processor performs image processing for at least part of a pattern of an object smaller than the predetermined size on the image data having the second resolution.

10. A non-transitory computer-readable medium having stored thereon computer-readable instructions which when executed by a computer cause the computer to execute a method for forming an image according to light emitted from a light source, the method comprising:
    performing, via a first image processor, image processing on image data having a first resolution and outputting the resulting image data;
    acquiring the image data having the first resolution output from the first image processor;
    converting the image data to image data having a second resolution that is higher than the first resolution;
    modulating the image data having the second resolution according to a clock signal to generate a modulation signal;
    driving the light source according to the modulation signal; and
    performing, via a second image processor, image processing on the image data having the second resolution to be modulated to the modulation signal, wherein
    the second image processor acquires object information that indicates a type of an object in the image data and determines whether or not to perform image processing based on the acquired object information,
    the first image processor performs image processing for at least part of a pattern of an object having a predetermined size or larger on the image data having the first resolution, and the second image processor performs image processing for at least part of a pattern of an object smaller than the predetermined size on the image data having the second resolution.

\* \* \* \* \*